United States Patent
Panusopone et al.

(10) Patent No.: US 6,859,494 B2
(45) Date of Patent: Feb. 22, 2005

(54) METHODS AND APPARATUS FOR SUB-PIXEL MOTION ESTIMATION

(75) Inventors: Krit Panusopone, San Diego, CA (US); David M. Baylon, San Marcos, CA (US)

(73) Assignee: General Instrument Corporation, Horsham, PA (US)

( * ) Notice: Subject to any disclaimer, the term of this patent is extended or adjusted under 35 U.S.C. 154(b) by 506 days.

(21) Appl. No.: 09/917,185

(22) Filed: Jul. 27, 2001

(65) Prior Publication Data

US 2003/0021344 A1 Jan. 30, 2003

(51) Int. Cl.$^7$ ................................................ H04B 1/66
(52) U.S. Cl. ................................................ 375/240.16
(58) Field of Search ........................... 375/240.01, 240, 375/240.15, 240.16; 348/413.1–416.1; H04B 1/66

(56) References Cited

U.S. PATENT DOCUMENTS

| | | | |
|---|---|---|---|
| 5,093,720 A | | 3/1992 | Krause et al. |
| 5,398,079 A | | 3/1995 | Liu et al. |
| 5,565,922 A | | 10/1996 | Krause |
| 5,638,128 A | | 6/1997 | Hoogenboom et al. |
| 6,154,491 A | | 11/2000 | Uetani ........................ 375/240 |
| 6,278,735 B1 | * | 8/2001 | Mohsenian ................. 375/240 |
| 6,304,603 B1 | * | 10/2001 | Kang ..................... 375/240.16 |
| 2002/0009143 A1 | * | 1/2002 | Arye ..................... 375/240.16 |

OTHER PUBLICATIONS

International Organization For Standardization, "MPEG–4 Video Verification Model Version 10.0", ISO/IECJTC1/SC29/WG11, Coding of Moving Pictures and Associated Audio Information, Feb. 1998, pp. 1–305, XP–001074652.

International Organization For Standardization, "Test Model 5", ISO/IECJTC1/SC29/WG11/N0400, Coded Representation of Picture and Audio Information, Document AVC–491B, Version 2, Apr. 1993, pp. 1–119, XP–001150695.

Kim, Bo–Sung et al., "VLSI Architecture for Low Power Motion Estimation using High Data Access Reuse", AP–ASIC '99, IEEE Aug. 1999, pp. 162–165.

Wu, Angus et al., "An Efficient VLSI Implementation of Four–Step Search Algorithm", Electronics, Circuits and Systems, 1998 IEEE International Conference, Sep. 1998, pp. 503–506.

Po, Lai–Man et al., "A New Center–Biased Orthogonal Search Algorithm For Fast Block Motion Estimation", IEEE TENCON—Digital Signal Processing Applications, Nov. 1996, pp. 874–877.

\* cited by examiner

Primary Examiner—Tung T. Vo
(74) Attorney, Agent, or Firm—Barry R. Lipsitz; Douglas M. McAllister

(57) ABSTRACT

The methods and apparatus is for sub-pel motion estimation of a block of pixels. Search points which are redundant between the various full pel and sub-pel searches during the motion estimation process of a block of pixels are disregarded. Matching costs for the block or sub-block at each such redundant search point are not calculated and therefore are not stored.

64 Claims, 8 Drawing Sheets

METHODS AND APPARATUS FOR SUB-PIXEL MOTION ESTIMATION

BACKGROUND OF THE INVENTION

The present invention relates generally to the compression of digital data. More specifically, the present invention relates to methods and apparatus for providing sub-pixel motion estimation for encoding a digital video signal.

A substantial amount of digital data must be transmitted in digital television systems and the like. A digital television signal includes video, audio, and other data (such as Electronic Programming Guide (EPG) data, and the like). In order to provide for efficient broadcast of such digital signals, it is advantageous to compress the digital signals to minimize the amount of data that must be transmitted.

The video portion of the television signal comprises a sequence of video "frames" that together provide a moving picture. In digital television systems, each line of a video frame is defined by a sequence of digital data bits, or pixels (also referred to herein as "pels"). Each video frame is made up of two fields, each of which contains one half of the lines of the frame. For example, a first or odd field will contain all the odd numbered lines of a video frame, while a second or even field will contain the even numbered lines of that video frame. A large amount of data is required to define each video frame of a television signal. For example, 7.4 megabits of data is required to provide one video frame of a National Television Standards Committee (NTSC) television signal. This assumes a 640 pixel by 480 line display is used with 8 bits of intensity value for each of the primary colors red, green, and blue. High definition television requires substantially more data to provide each video frame. In order to manage this amount of data, the data must be compressed.

Digital video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, motion compensation (also known as differential encoding) is used to transmit only the difference between an actual frame and a prediction of an actual frame. The prediction is derived from a previous (or future) frame of the same video sequence. In such motion compensation systems, motion vectors are derived, for example, by comparing a block of pixel data from a current frame to similar blocks of data in a previous frame. A motion estimator determines how a block of data from the previous frame should be adjusted in order to be used in the current frame.

Motion compensation is extensively used in video codecs as a means to exploit temporal redundancy between frames (and/or fields) of video. Most standard based video decoders (e.g., those implementing Moving Picture Experts' Group (MPEG) standards 1 and 2) allow one or two translational motion vectors (MV) per block of pixels. These MVs are computed by a motion estimation (ME) process in the video encoder. The most reliable ME algorithm, a full search block matching algorithm (FS-BMA), is widely used in reference software as a benchmark. FS-BMA requires high computational complexity since it attempts to match every possible candidate in the search area, thereby making it impractical for a real-time video encoder. Various "fast" search algorithms have been proposed and utilized in real-time encoders. Most of these techniques sacrifice search quality by using only a subset of the search area in order to reduce the total number of searches. However, most of the existing fast algorithms focus on a full pel resolution ME and are not applicable to half pel. In order to achieve the final half pel MV, the encoder performs a full search at half pel positions around the full pel result from the fast algorithm.

To minimize motion compensated differences, video codecs should generally utilize a dense motion field and fine MV resolution. A single MV with half pel accuracy for every 8×8 block of pixels is typically employed by modem video codecs. A MV for a smaller block size (2×2 and 4×4) with higher accuracy (up to an eighth of a pixel) is useful for tracking the motion of small objects, and such systems are currently being developed in next generation video codecs. The complexity of ME is more pronounced when the MV has sub-pixel resolution since the number of search points increases exponentially as the MV resolution increases. To deal with these additional search points, most real time encoders adopt a hierarchical approach which does not perform FS-BMA at all sub-pixel search points. Instead, only search points that coincide with a full pel position are searched first. Search points at half pel positions surrounding the best matched candidate from a full pel search point are then searched. This process is repeated until the desired accuracy is reached. The complexity of sub-pixel ME is quite significant since most encoders perform a full search at this level even though a fast ME algorithm for full pel ME may be applied. For example, in the baseline ME method described below, this amounts to 18 sub-pixel search positions for every 16×16 block.

The baseline ME method which is routinely used in reference software implementations consists of three main tasks, i.e. a full pel search for a 16×16 block (a 16×16 block is commonly known as a macroblock, or "MB"), a half pel search for a 16×16 block, and a half pel search for an 8×8 sub-block. FIG. 1 shows an example of such a prior art baseline method (boundary effects are ignored in FIG. 1). In FIG. 1, "X" denotes search points from a first task; "+" denotes search points from a second task; and "O" denotes search points from a third task. The first task (16×16 full pel search) matches the current block with every candidate at the full pel position in the search window in the reference frame to find a best matched block. The best matched block from the first task is denoted as 10 in FIG. 1. The search window for the first task is centered at the same coordinate as the current block and is extended in each direction by an amount indicated by the user. The second task (16×16 half pel search) matches the current block with every candidate block at the half pel position in the search window to locate a new best matched half pel block, denoted as 20 in FIG. 1. The search window center of the second task search is at the position of the best matched block 10 from the first task, and each side is extended by one half pel for a total of nine candidate blocks (i.e. the nine search points indicated by "+" in FIG. 1). The third task (8×8 half pel search) matches four sub-blocks of the current block (obtained by dividing the current 16×16 block into four equal 8×8 sub-blocks) with every candidate at the half pel position in their respective windows to obtain four best matched 8×8 half pel sub-blocks (designated 30, 32, 34, and 36 in FIG. 1). The search window centers for each third task search are at the positions of the corresponding sub-blocks of the best matched block 20 from the second task, and each side is extended by one half pel (+/−1*0.5 pel) for a total of nine candidate blocks.

It would be advantageous to provide a ME algorithm which reduces the number of searches and computations performed as compared to the prior art ME process, while improving or maintaining the search quality. It would be further advantageous to reduce the number of searches and computations by discarding redundant search points between at least two of the searches performed in the baseline method described above (i.e. by discarding redundant search points between one of the first and third task, the second and third task, and the first and second task). It would be still further advantageous to provide for a ME process which is easily extendible to higher sub-pixel resolutions, such as one half pel, one quarter pel, one eighth pel, and beyond.

The methods and apparatus of the present invention provide the foregoing and other advantages.

SUMMARY OF THE INVENTION

The present invention relates to methods and apparatus for providing sub-pixel motion estimation for encoding a digital video signal. In a first task, a full pel search is conducted in a first predefined search area of a first video frame to locate a best matched full pel block of pixels from a number of candidate blocks of pixels in the first predefined search area which is a closest match to a current block of pixels in a second video frame. The current block of pixels is divided into N current sub-blocks of pixels for use in a second task. In the second task, two searches are conducted: (1) a first sub-pel search in a second predefined search area of the first video frame to locate N separate best matched sub-pel sub-blocks of pixels from a number of candidate sub-pel sub-blocks of pixels in the second predefined search area which are a closest match for each of the N current sub-blocks of pixels, respectively; and (2) a second sub-pel search in the second predefined search area to locate a best matched sub-pel block of pixels from a number of candidate sub-pel blocks of pixels in the second predefined search area which is a closest match to the current block of pixels in the second video frame. In a third task, N separate sub-pel searches are conducted in a third predefined search area to locate a new best matched sub-pel sub-block of pixels from a number of candidate sub-pel sub-blocks of pixels in the third predefined search area for each of the N current sub-blocks of pixels. Search points and matching costs for at least one of the following are stored: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task.

However, search points are not stored which are redundant between at least one of: (1) the first and third tasks during the third task; (2) the first and second tasks during the second task; and (3) the second and third tasks during the third task, such that the matching costs for these redundant search points are not calculated and not stored. In this manner, search times and processing costs are reduced as compared to traditional prior art full searches.

Although the invention is described herein in connection with searches between frames, it should be understood that the searches can also (or alternatively) be made between different fields in the same frame. The use of the word "frame" in the description and claims is intended to cover either implementation; i.e., searching among different frames or searching among different fields of the same frame or different frames.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

Figure 1:
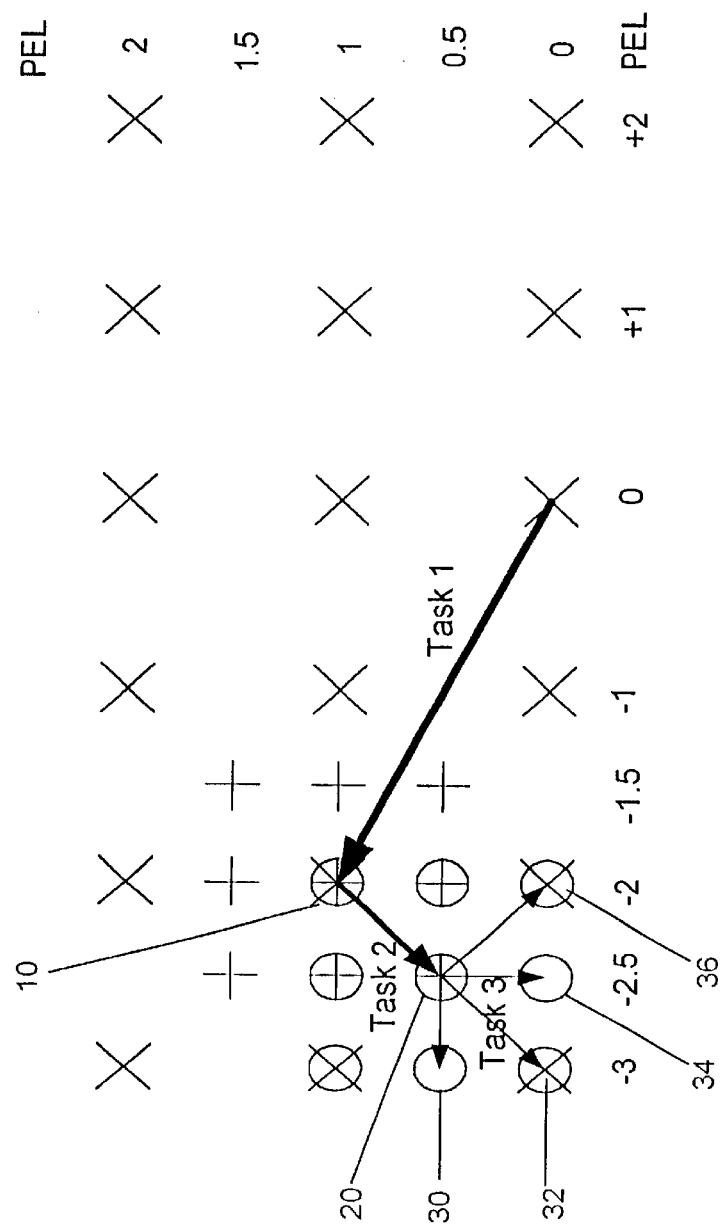
FIG. 1 shows a prior art motion estimation technique.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

In general, the present invention provides for an improved motion estimation process by disregarding search points which are redundant between the various full pel and sub-pel searches of the first, second, and third tasks of the baseline method discussed above in connection with FIG. 1. Matching costs for the block or sub-block at each such redundant search point are not calculated and therefore are not stored. For example, there are a number of obscured redundancies between the second and the third tasks of the baseline ME algorithm described in connection with FIG. 1. One example of such redundancy is the matchings between the current block (the block to be encoded using motion estimation) and its best matched block in the second task and those four matchings between the current block and the block at the center of the window in the third task. FIG. 2 shows these redundancies in a less disguised fashion under the assumption that four matchings in the third task are performed together with the same offset. FIG. 2 shows redundant search points between the second and third tasks. "X" denotes the search point from the first task (i.e. the best matched block 10), "+" denotes the search points from the second task, and "O" denotes search points from the third task. The arrows denote a motion vector resulting from the second task (i.e. the best matched 16×16 half pel block from nine candidate blocks in a search window the center of which is located at the best matched block 10 from the first task full pel search). It is evident from FIG. 2 that redundancies can be grouped into three different cases, i.e. at the center, on the side, and at the corner. In the first case (center), all search points in the third task are redundant since the best matched block of the second task is at the center (not shown). In the second case (side), the best matched block 10 is on the side of the search window 12 of the third task, and six search points in the third task are redundant. In the third case (corner), four search points in the third task are redundant since the best matched block 10 in the second task is at the corner of the search window 12 from the third task. Assuming that the best matched block 10 in the second task occurs with an equal probability, redundant search points in the third task are (9+6+6+6+6+4+4+4+4)/9=5.4 points out of nine possible positions, or about 60.5% redundancy. (If the search range for the second and third tasks is +/−2*0.5 pel instead of +/−1*0.5 pel, the redundancy is about 57.8%.) In any event, the redundancy is bounded by 44.4% (4 redundant points) and 100%.

The inventive concept can also be applied to eliminate redundancies among the first, second, and third tasks. FIG. 3 illustrates these redundancies under the same assumption as that used in FIG. 2. Again, there are three distinct cases when incorporating information from the first and second tasks. "X" denotes the search points from the first task, "+" denotes the search points from the second task, and "O" denotes search points from the third task. The best matched block from the first task is block 10. In the first case (center), no search is necessary since the best matched block of the second task is at the center, and information from the first task does not help in this case. In the second case (side), there are now seven redundancies, compared to the six redundancies mentioned above between the second and third tasks (FIG. 2). Similarly, in the third case (corner), there are now also seven redundancies in the third task. Assuming again that the best matched block in the second task occurs with an equal probability, redundant search points in the third task are now (9+7+7+7+7+7+7+7+7)/9=7.2 points out of nine possible positions, or about 80.2% redundancy. In fact, at most two new positions need to be searched in the third task. The redundancy range is expected to be between 77.8% and 100%.

Figure 2:
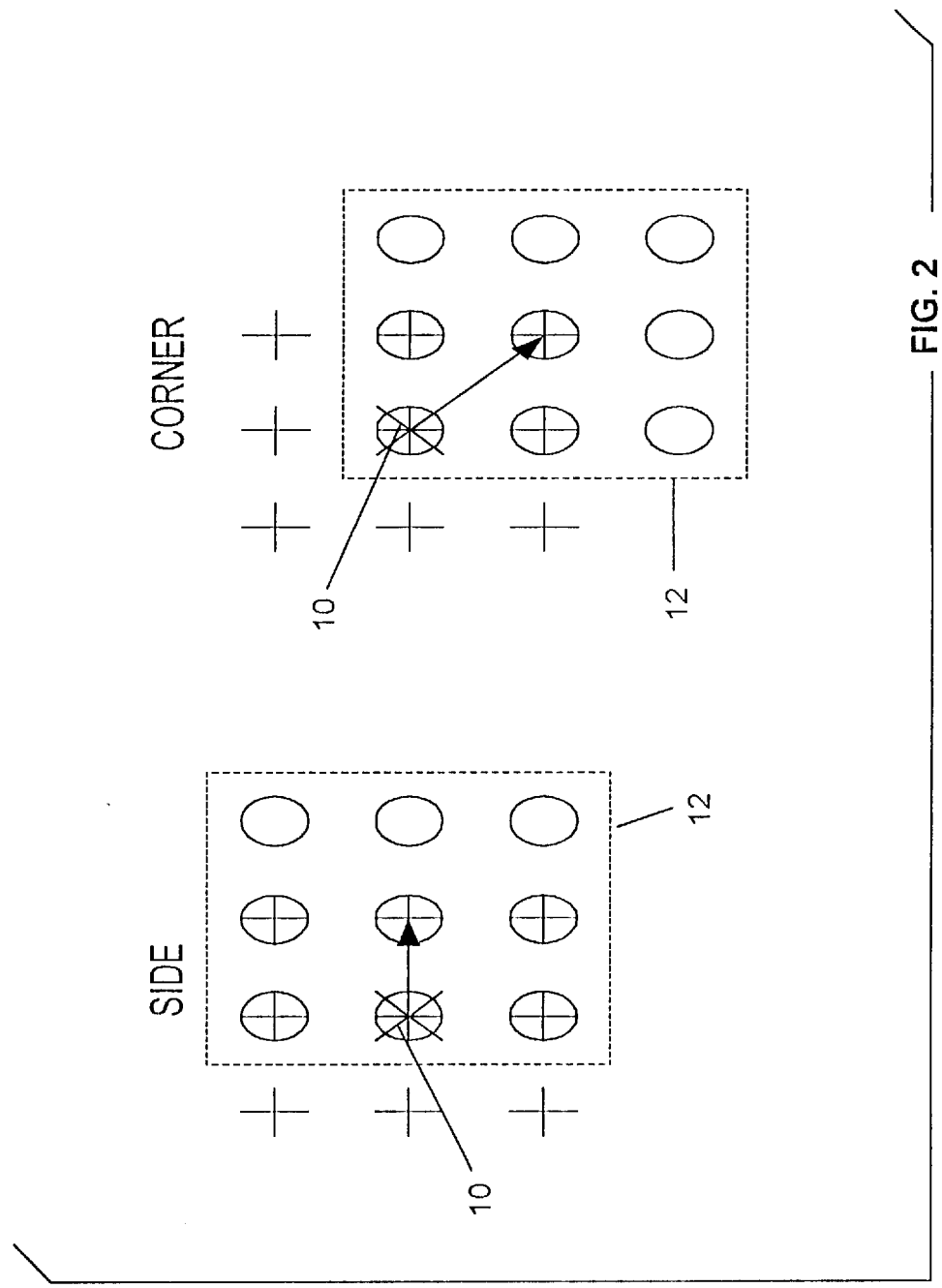
FIG. 2 shows redundancies between tasks of the prior art motion estimation technique of FIG. 1.
Figure 3:
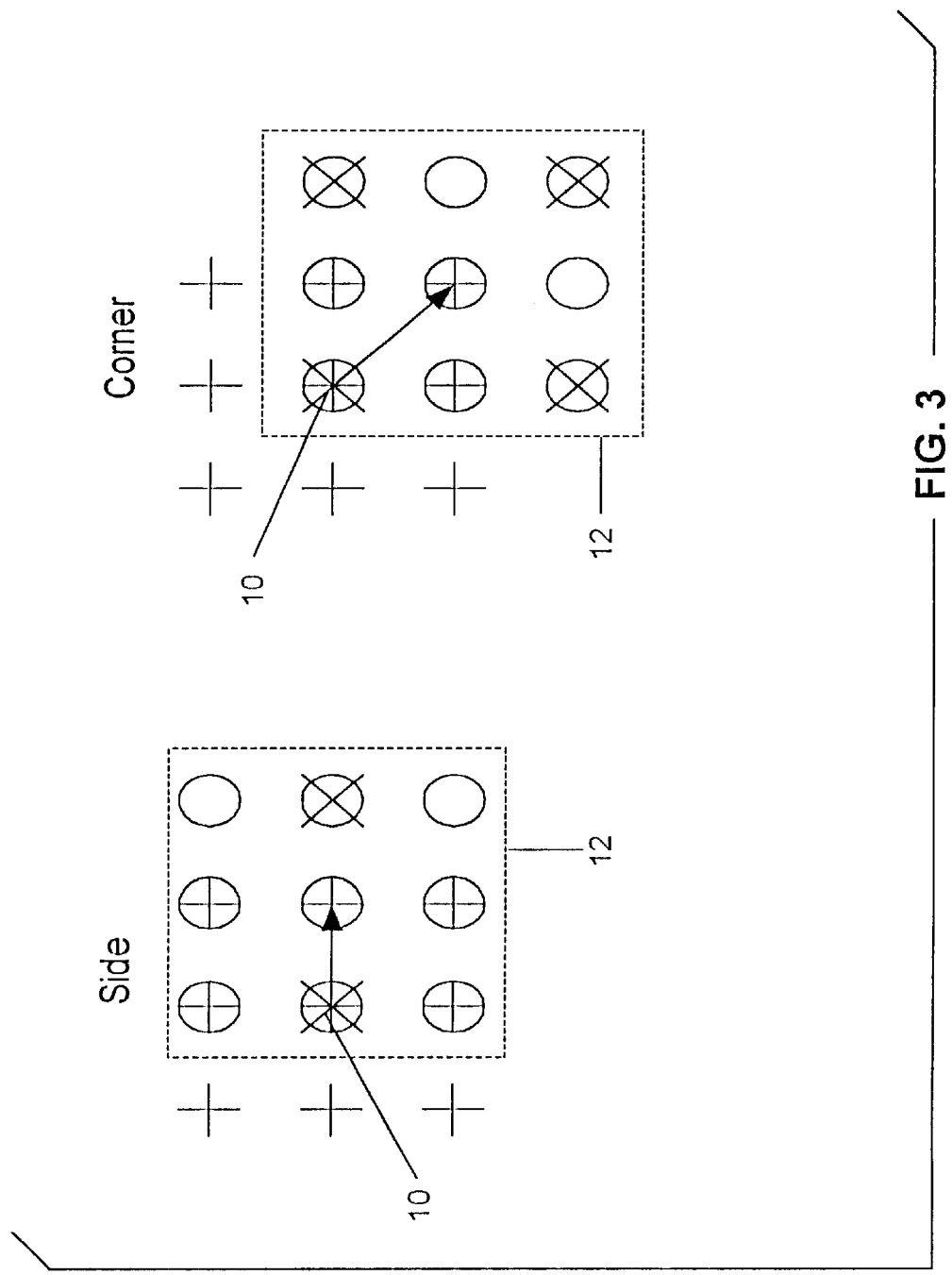
FIG. 3 shows further redundancies between tasks of the prior art motion estimation technique of FIG. 1.

It should be appreciated that FIGS. 1–3 show redundancies in a prior art motion estimation method, which are discussed herein for comparison purposes only. The specific search range, search resolution, and block size discussed in connection with FIGS. 1–3 are provided for purposes of example only.

Figure 4:
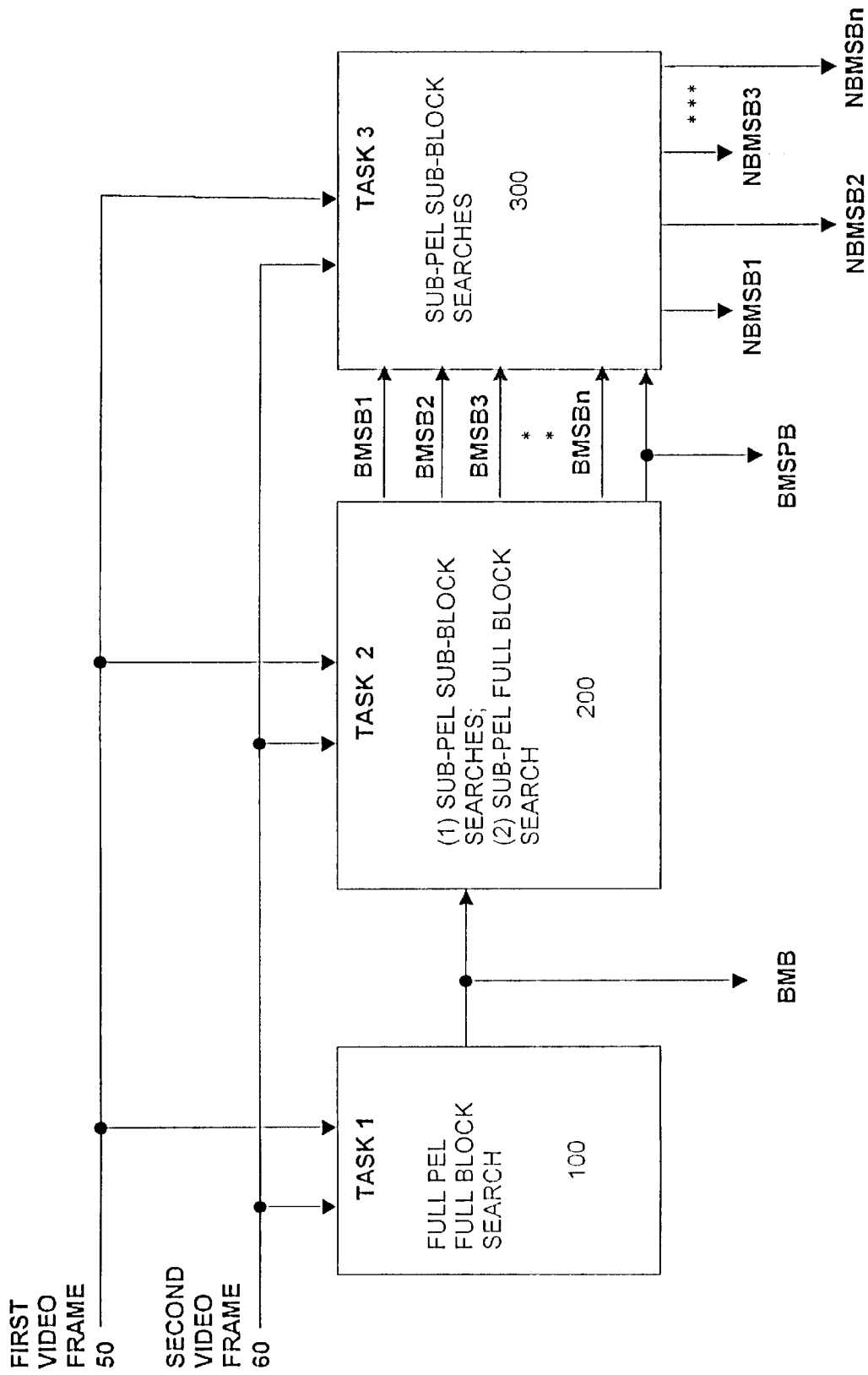
FIG. 4 shows an example embodiment of the invention.

In an exemplary embodiment as shown in FIG. 4, a method for motion estimation between blocks of pixels from a first video frame 50 and a second video frame 60 is provided. Those skilled in the art will appreciate that the terms "first" video frame and the "second" video frame do not necessarily denote the timing of the frames in a video stream, especially in an MPEG system. The designations "first" and "second" are used herein only to differentiate between two video frames from the same sequence, and it should be appreciated that the first video frame may sometimes precede the second video frame or it may sometimes follow the second video frame. In addition, there may sometimes be frames in between the first and second video frame. Moreover, as noted above, the term "frame" as used herein and in the claims is also intended to encompass motion estimation between fields, which can be in the same or different frames.

In accordance with the invention, a current block of pixels (i.e. a block of pixels to be encoded) from a second video frame 60 is adaptively processed in a first task 100. The current block of pixels and current sub-blocks of pixels of the current block of pixels are adaptively processed in a second task 200. The current sub-blocks of pixels are then adaptively processed in a third task 300. As a result, search points in the first video frame 50 are located for: (1) a block of pixels from the first task 100, designated by BMB; (2) a block and a plurality of sub-blocks of pixels from the second task 200, said full block designated by BMSPB, and said sub-blocks designated by BMSB1, BMSB2, BMSB3, . . . , and BMSBn; and (3) a plurality of sub-blocks of pixels from the third task 300, designated NBMSB1, NBMSB2, NBMSB3, . . . and NBMSBn. These blocks and sub-blocks (BMB, BMSPB, BMSB1, BMSB2, BMSB3, . . . , and BMSBn, and NBMSB1, NBMSB2, NBMSB3, . . . and NBMSBn) provide the lowest matching costs for either the current block of pixels or the current sub-blocks of pixels obtained at the completion of the respective task. The matching cost is a measurement of the distortion between the current block or current sub-blocks from the second frame 60 and the blocks and sub-blocks (candidate blocks or sub-blocks) from the first frame 50 located during the first, second and third tasks.

The designation BMB denotes the best matched full pel block obtained from the first task. The designation BMSPB denotes the best matched sub-pel block obtained from the second task. The designations BMSB1, BMSB2, BMSB3, . . . , and BMSBn denote the N best matched sub-pel sub-blocks obtained from the second task. The designations NBMSB1, NBMSB2, NBMSB3, . . . and NBMSBn denote the N new best matched sub-pel sub-blocks obtained from the third task.

During this process, search points are discarded which are redundant between at least one of: (1) the first and third tasks (100, 300) during the third task 300; (2) the first and second tasks (100, 200) during the second task 200; and (3) the second and third tasks (200, 300) during the third task 300. As a result, search time and processing costs are reduced, since matching costs are not computed for the redundant search points. As shown above in connection with FIGS. 2 and 3, the time and processing savings may be substantial, as the number of redundant search points between the searches among the three tasks may be as high as 77% to 100%.

In the first task 100, a full pel search may be conducted in a first predefined search area of a first video frame 50 to locate a best matched full pel block BMB of pixels from a number of candidate blocks of pixels in the first predefined search area which is a closest match to a current block of pixels in a second video frame 60. The current block of pixels may be divided into N current sub-blocks of pixels for use in the second task 200. In the second task 200, two searches may be conducted: (1) a first sub-pel search in a second predefined search area of the first video frame to locate N separate best matched sub-pel sub-blocks of pixels (e.g., BMSB1, BMSB2, BMSB3, . . . BMSBn) from a number of candidate sub-pel sub-blocks of pixels in the second predefined search area which are a closest match for each of the N current sub-blocks of pixels, respectively; and (2) a second sub-pel search in the second predefined search area to locate a best matched sub-pel block of pixels BMSPB from a number of candidate sub-pel blocks of pixels in the second predefined search area which is a closest match to the current block of pixels in the second video frame 60. In the third task 300, N separate sub-pel searches may be conducted in a third predefined search area to locate a new best matched sub-pel sub-block of pixels from a number of candidate sub-pel sub-blocks of pixels in the third predefined search area for each of the N current sub-blocks of pixels (NBMSB1, NBMSB2, NBMSB3, . . . , and NBMSBn).

It should be appreciated that the number of candidate blocks or sub-blocks in a given search area will depend not only on the size of the search area and the size of the blocks or sub-blocks, but also on the resolution (e.g., full pel, half pel, quarter pel, etc.) of the search area and the blocks and sub-blocks. For example, a search range of +/−0.5 pel will provide nine search points corresponding to nine candidate 8×8 half pel sub-blocks of pixels.

The new best matched sub-pel sub-blocks NBMSB1, NBMSB2, NBMSB3, . . . , and NBMSBn in the third task 300 are determined by comparing each respective candidate sup-pel sub-block in the third task 300 to the respective best matched sub-pel sub-block (BMSB1, BMSB2, BMSB3, . . . BMSBn) from the second task 200, as well as to the other candidate sub-pel sub-blocks in the third predefined search area. Those skilled in the art will appreciate that there may not be a better matched sub-block located during the third search as compared to the best matched sub-pel sub-blocks located during the second search. In that event, one or more of the new best matched sub-pel sub-blocks in the third task will comprise the corresponding best matched sub-pel sub-block from the second task. In addition, where the second and third predefined search areas overlap, one or more of the candidate sub-pel sub-blocks from the third task may be the same as one or more of the N best matched sub-pel sub-blocks from the second task. In this instance, one or more of the new best matched sub-pel sub-blocks from the third task may comprise the corresponding best matched sub-pel sub-block from the second task.

At least one of: (1) search points and matching costs for at least one candidate block of pixels (e.g., BMB) from the first task; (2) search points and matching costs for a plurality of candidate sub-pel sub-blocks of pixels (e.g., BMSB1, BMSB2, BMSB3, . . . and BMSBn) from the second task; (3) search points and matching costs for at least one candidate sub-pel block of pixels (e.g., BMSPB) from the second task; and (4) search points and matching costs for a plurality of candidate sub-pel sub-blocks of pixels (e.g., NBMSB1, NBMSB2, MBMSB3, . . . and BMSBn) from the third task, may be stored. These stored search points are the search points that are not redundant, and the corresponding matching costs for each search point can be compared to one another (i.e., blocks compared with blocks and sub-blocks compared with sub-blocks) to determine which blocks and sub-blocks have the lowest matching costs (i.e., which are the closest match to the current block or current sub-blocks). The matching costs for the candidate blocks and sub-blocks located at the redundant search points are not calculated and are not stored.

Those skilled in the art will recognize that the invention may be implemented such that all non-redundant candidate blocks and sub-blocks are stored, not just the best matched blocks and sub-blocks from the respective tasks. For example, all full pel candidate blocks of pixels from the first task may be stored, all candidate sub-pel blocks of pixels from the second task which are not redundant over the candidate full pel blocks from the first task may be stored, all candidate sub-pel sub-blocks of pixels from the second task may be stored, and all candidate sub-pel sub-blocks of pixels from the third task which are not redundant over the candidate sub-pel blocks of pixels from the second task may be stored. This method closely approximates the prior art "full search" method described above, while still providing faster search times. Alternately, only those blocks and sub-blocks that are determined to be the best matched block or sub-block in the respective task may be stored, provided they are not redundant. For example, the invention may be implemented to store only the search point and matching cost for the best matched full pel block of pixels from the first task (i.e. BMB), the N separate best matched sub-pel sub-blocks of pixels and the best matched sub-pel block of pixels from the second task (i.e. BMSPB, BMSB1, BMSB2, BMSB3, . . . and BMSBn), and the N separate new best matched sub-pel sub-block of pixels from the third task (i.e. NBMSB1, NBMSB2, NBMSB3, . . . and NBMSBn). This method provides substantial improvement in search time over the prior art full search method, and provides the same or better results.

One or more motion vectors for encoding the current block of pixels in the second video frame may be calculated based on one of: (1) the N new best matched sub-pel sub-blocks of pixels from the third task (NBMSB1, NBMSB2, NBMSB3, . . . and NBMSBn); or (2) the best matched sub-pel block of pixels from the second task (BMSPB). Whether the N new best matched sub-pel sub-blocks NBMSB1, NBMSB2, NBMSB3, . . . and NBMSBn from the third task or the best matched sub-pel block BMSPB from the second task is used is based on a comparison of the sum of the matching costs of the N new best matched sub-pel sub-blocks with the matching cost of the best matched sub-pel block. For example, if the sum of the matching costs for the N new best matched sub-pel sub-blocks NBMSB1, NBMSB2, NBMSB3, . . . and NBMSBn is lower than that of the best matched sub-pel block BMSPB, the N new best matched sub-pel sub-blocks NBMSB1, NBMSB2, NBMSB3, . . . and NBMSBn will be used to calculate the motion vector, and vice versa. However, due to the fact that more bits are needed for encoding the four sub-blocks as compared to encoding a single block, the invention may be implemented with a bias favoring the encoding of the block in cases where the sum of the matching costs of the sub-blocks is only slightly less than the matching cost of the block.

The first predefined search area may be centered in the first video frame 50 at a location corresponding to that of the current block of pixels in the second video frame 60. The second predefined search area may be centered at the best matched block of pixels BMB located during the first task. The third predefined search area may be centered at the best matched sub-pel block of pixels BMSPB located during the second task. The third predefined search area may have N search windows corresponding respectively to each of the N separate sub-pel sub-block searches.

For example, in the embodiment shown in FIG. 4, the third predefined search area may comprise a block of pixels in the first frame 50 centered at block BMSPB from the second task. N search windows will be provided, corresponding to N sections of the third predefined search area, since FIG. 4 assumes that N sub-blocks make up a full block. It should be appreciated that, in the example shown in FIG. 4, N sub-pel sub-block searches are undertaken in both the second task 200 and the third task 300. Each sub-pel sub-block search in the third task 300 will result in comparisons among only candidate sub-blocks in that respective search window, and to a corresponding one of the best matched sub-blocks from the second task 200. For example, a first of the N sub-pel searches in the third task, which results in a new best matched sub-pel sub-block NBMSB1, compares, in turn, all candidate sub-pel sub-blocks in a first of the N search windows first against a corresponding best matched sub-pel sub-block from the second task (e.g., BMSB1), and then against each other candidate sub-block in that search window. Each time a candidate sub-block is a better match than the sub-block it is being compared against, that candidate sub-block becomes, up until that point in the search, the new best matched sub-pel sub-block.

The first predefined search area in the first video frame 50 may comprise a general region around the corresponding position of the current block of pixels in the second video frame 60. The second predefined search area may be extended in all directions by at least one sub-pel beyond the best matched block of pixels (e.g., block BMB obtained from the first task 100). Each of the N search windows may be extended in all directions by at least one sub-pel beyond a respective sub-pel sub-block of pixels obtained from the best matched sub-pel block (e.g., BMSPB) located during the second task 200.

In one embodiment of the invention, the search points and matching costs for the plurality of candidate sub-pel sub-blocks from the third task 300 may comprise at least the search points and matching costs for the N new best matched sub-pel sub-blocks (NBMSB1, NBMSB2, NBMSB3, . . . and NBMSBn). In this embodiment, one or more motion vectors for encoding the current block of pixels in the second video frame may be calculated based on one of: (1) the N-new best matched sub-pel sub-blocks of pixels (NBMSB1, NBMSB2, NBMSB3, . . . and NBMSBn) from the third task 300; or (2) the best matched sub-pel block of pixels BMSPB from the second task 200.

In an alternate embodiment of the invention, each of (1) the search points and matching costs for at least one candidate block of pixels from the first task 100; (2) the search points and matching costs for a plurality of candidate sub-pel sub-blocks from the second task 200; (3) search points and matching costs for at least one candidate sub-pel block of pixels from the second task 200; and (4) the search points and matching costs for a plurality of candidate sub-pel sub-blocks from the third task 300, are stored. Search points which are redundant between each of: (1) the first and third tasks; (2) the first and second tasks; and (3) the second and third tasks are discarded, such that the matching costs for the candidate blocks and sub-blocks located at such redundant search points are not calculated.

Alternately, the search points and matching costs for at least one candidate block of pixels from the first task 100 are stored. In this embodiment, search points which are redundant between the first and second tasks are discarded, such that the matching costs for the candidate blocks located at such redundant search points are not calculated.

Figure 5:
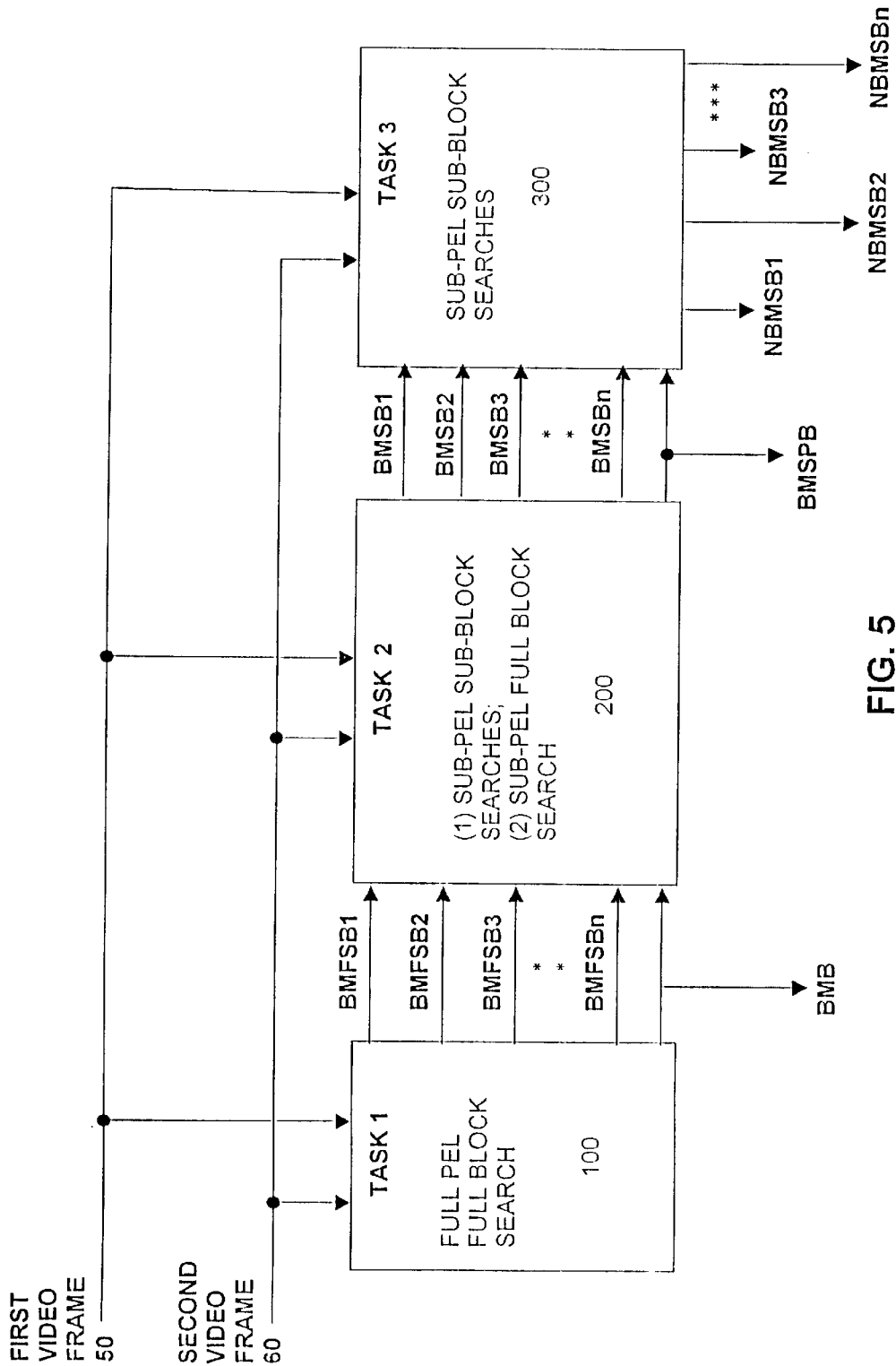
FIG. 5 shows a further example embodiment of the invention.

In a further embodiment of the invention as shown in FIG. 5, the first task 100 may also include a full pel search conducted in the first predefined search area of the first video frame 50 to locate N separate best matched full pel sub-blocks of pixels BMFSB1, BMFSB2, BMFSB3, . . . and BMFSBn from a number of candidate full pel sub-blocks of pixels in the first predefined search area which are a closest match for each of the N current sub-blocks of pixels, respectively. The search points and matching costs for a plurality of candidate full pel sub-blocks of pixels from the first task 100 are stored, such that search points which are redundant between at least one of: (1) the first and second tasks; and (2) the first and third tasks, can be discarded. Matching costs for the candidate blocks and sub-blocks located at such redundant search points are not calculated.

In another embodiment of the invention, the search points and matching costs for a plurality of candidate sub-pel sub-blocks from the second task 200 are stored. In this embodiment, search points which are redundant between the second and third tasks are discarded, such that the matching costs for the candidate blocks and sub-blocks located at such redundant search points are not calculated.

Each predefined search area may be a square block of pixels, a rectangular block of pixels, a diamond-shaped block of pixels, or an irregular shaped block of pixels. However, those skilled in the art will recognize that the particular shape of the search area is not critical to the inventive concept. The invention may be implemented utilizing search areas of varying size and shape.

Those skilled in the art will also recognize that, for the second and third tasks, the pixel data in the first video frame 50 for each block and sub-block of pixels may need to be interpolated to sub-pel resolution for the second and third tasks.

In one embodiment of the invention, the search range of the second task 200 may be $+/-n*p$ pel in the horizontal direction and $+/-m*p$ pel in the vertical direction, where n and m are any positive integers and p is any fraction. In such an embodiment, the search points of the third task 300 are considered redundant over the search points of the second task where a distance of a search point of the third task 300 from a center of the second predefined search area is: (1) less than or equal to $n*p$ pel in a horizontal direction; and (2) less than or equal to $m*p$ pel in a vertical direction. Matching costs for candidate blocks located at the redundant search points are not calculated. The sub-pel searches in this embodiment may comprise one of: (1) a ½ pel search where p equals 0.5; (2) a ¼ pel search where p equals 0.25; or (3) a ⅛ pel search where p equals 0.125.

The first task 100 may consist of computing a matching cost between each candidate block and the current block of pixels. Each matching cost from each candidate block may be compared in turn with a lowest matching cost previously found, such that the best matched full pel block of pixels BMB is a candidate block of pixels providing the lowest matching cost.

The second task 200 may consist of, in the first sub-pel search, computing a matching cost between each candidate sub-pel sub-block and a respective one of the N current sub-blocks of pixels. Each matching cost from each candidate sub-pel sub-block may be compared in turn with a lowest matching cost previously found for each current sub-block, such that the N best matched sub-pel sub-blocks of pixels (BMSB1, BMSB2, BMSB3, . . . and BMSBn) are the N candidate sub-pel sub-blocks of pixels providing the lowest matching cost for each of the N current sub-blocks, respectively. In the second sub-pel search of the second task 200, a matching cost between each sub-pel candidate block and the current block of pixels may be computed. Each matching cost from each candidate sub-pel block may be compared in turn with a lowest matching cost previously found, such that the best matched sub-pel block of pixels BMSPB is a candidate sub-pel block of pixels providing the lowest matching cost.

In the second task 200, the first sub-pel search and the second sub-pel search may be performed simultaneously. In this embodiment, the matching costs for each candidate sub-pel block of pixels comprises the sum of the matching costs of N of the sub-pel sub-blocks of pixels.

The third task 300 may consist of computing a matching cost between each candidate sub-pel sub-blocks and a respective one of the N current sub-blocks of pixels. Each matching cost from each candidate sub-pel sub-block may be compared in turn with a lowest matching cost previously found for each current sub-block, such that the N new best matched sub-pel sub-blocks of pixels (NBMSB1, NBMSB2, NBMSB3, . . . and NBMSBn) are the N candidate sub-blocks of pixels providing the lowest matching cost for each of the N current sub-blocks, respectively.

It should be appreciated that the number N of the sub-blocks may be any positive integer greater than one. In other words, the invention may be implemented such that the full block of pixels may be made up of any number of sub-blocks. For example, where the blocks of pixels comprise 16×16 blocks of pixels, the sub-blocks may comprise either 8×8 blocks of pixels, 6×6 blocks of pixels, 4×4 blocks of pixels, or 2×2 blocks of pixels. Where the blocks comprise 8×8 blocks of pixels, the sub-blocks may comprise either 6×6 blocks of pixels, 4×4 blocks of pixels, or 2×2 blocks of pixels. Those skilled in the art will appreciate that many other combinations of sizes of blocks and sub-blocks exist and may be used to implement the invention, including odd sized blocks (e.g., 9×9, 3×9, etc.) and sub-pel sized blocks (e.g., 8.5×8.5, 9.5×9.5, etc.).

The sub-pel searches may comprise ½ pel searches, a ¼ pel searches, a ⅛ pel searches, or even higher resolution searches. In addition, although the invention is described in connection with a full pel search in the first task 100 and the second task 200, those skilled in the art will appreciate that these full pel searches may in fact comprise a sub-pel search, with the remaining sub-pel searches in the second task 200 and the third task 300 comprising sub-pel searches at a higher resolution. In other words, the full pel searches described above can easily be replaced by sub-pel searches, for example, by half-pel searches. In that instance, the sub-pel searches described above may be, for example, quarter-pel searches or eighth-pel searches, etc.

It should also be appreciated that, although the invention is described above in connection with first, second and third tasks, these designations are included herein for purposes of ease of explanation of the invention only. Further, the invention may be implemented having only a first and a second task as those terms are used herein. Alternately, the invention may be implemented having more than three tasks. For example, a first task may include a full pel block search, a second task may include a half pel block search and multiple half pel sub-block searches, a third task may include multiple half pel sub-block searches, and a fourth task may include multiple quarter pel sub-block searches. As discussed above, the invention may be extended to even higher resolution searches, such as an eighth of a pel and beyond.

The sub-blocks of pixels may each contain an identical number of pixels. The sub-block of pixels may comprise identically shaped blocks of pixels each containing an identical number of pixels.

Figure 6:
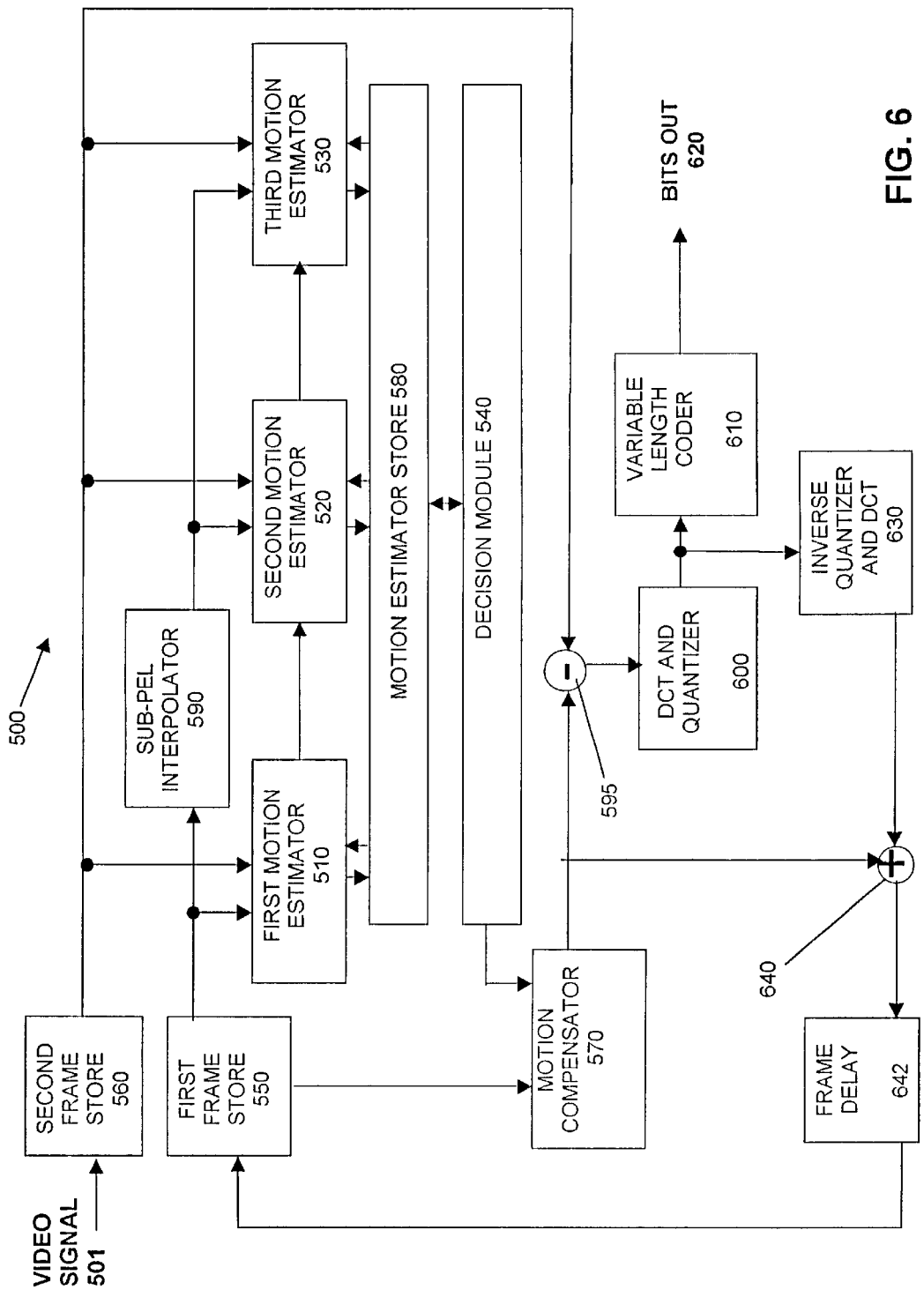
FIG. 6 shows a block diagram of an encoder in accordance with the invention.

The foregoing methods for implementing the invention may be performed, for example, in an encoder 500 as shown in FIG. 6. Those skilled in the art will appreciate that the encoder 500 of FIG. 6 is but one example of an encoder that can be used to implement the present invention, and that many variations in the form and arrangement of the components of the encoder may be made by one skilled in the art when implementing the present invention, with the same result.

As shown in FIG. 6, the encoder 500 for encoding a current block of pixels using motion estimation is provided. A first motion estimator 510 is provided for adaptively processing a current block of pixels from a second video frame in the first task. A second motion estimator 520 is provided for adaptively processing said current block of pixels and current sub-blocks of pixels of said current block of pixels in the second task. A third motion estimator 530 is provided for adaptively processing said current sub-blocks of pixels in a third task. A decision module 540 is provided for determining search points in a first video frame for: (1) a block of pixels from the first task; (2) a block and a plurality of sub-blocks of pixels from the second task; and (3) a plurality of sub-blocks of pixels from the third task, which provide the lowest matching costs for one of said current block of pixels and said current sub-blocks of pixels. As discussed above, search points which are redundant between at least one of: (1) the first and third tasks during the third task; (2) the first and second tasks during the second task; and (3) the second and third tasks during the third task, are discarded.

The encoder 500 also includes a first frame store 550 for storing the first video frame (reference frame) and a second frame store 560 for storing the second video frame (current frame). A digital video signal 501 is provided to the second frame store 560. A motion compensator 570 is provided for predicting the current block of pixels using at least one of said blocks or said sub-blocks with the lowest matching costs from the decision module 540.

The first motion estimator 510 compares, in the first task during a full pel search, a full pel current block of pixels from said second video frame (from the second frame store 560) with a number of candidate full pel blocks of pixels from a first predefined search area of said first video frame (from the first frame store 550) to locate a best matched full pel block of pixels in the first predefined search area which is a closest match to the current block of pixels in said second video frame (second frame store 560).

The second motion estimator 520 compares: (1) in the second task during a first sub-pel search, N current sub-blocks of pixels obtained from dividing the current block of pixels with a number of candidate sub-pel sub-blocks of pixels from a second predefined search area of said first video frame (from first frame store 550 via sub-pel interpolator 590) to locate N separate best matched sub-pel sub-blocks of pixels in the second predefined search area which are a closest match for each of the N current sub-blocks of pixels, respectively; and (2) in the second task during a second sub-pel search, the current block of pixels with a number of candidate sub-pel blocks of pixels in the second predefined search to locate a best matched sub-pel block of pixels in the second predefined search area which is a closest match to the current block of pixels.

The third motion estimator 530 compares, in a third task sub-pel search, the N current sub-blocks of pixels with a number of candidate sub-pel sub-blocks of pixels from a third predefined search area of said first video frame (from the first frame store 550) to locate a new best matched sub-pel sub-block of pixels in the third predefined search area for each of the N current sub-blocks of pixels.

The decision module 540 determines which blocks and sub-blocks from at least one of the first, second and third motion estimators have the lowest matching costs. Memory (motion estimator store 580) is provided for storing at least one of: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task. As discussed above, the matching costs for the candidate blocks and sub-blocks located at the redundant search points are not calculated and not stored by the motion estimator store 580. Motion estimator store 580 may comprise separate memory devices for each motion estimator, or segmented sections of the same memory device corresponding to each motion estimator. The memory device(s) may take a variety of forms, such as a hard drive, an optical disk, or any other suitable type of mass storage device, or combination of devices.

The motion compensator 570 predicts the current block of pixels in the second video frame (from the second frame store 560) based on one of: (1) the N new best matched sub-pel sub-blocks of pixels from the third task; or (2) the best matched sub-pel block of pixels from the second task. The difference (residual) between the current block and its prediction is computed (subtraction function 595). This differential then undergoes a DCT (discrete cosine transform) and quantizer operation (e.g., at DCT and quantizer 600). The result is then is processed with a variable length coder 610 to produce the compressed bits out 620 (encoded bitstream) which can then be suitably decoded. The result also undergoes an inverse quantizer and DCT operation 630 which is then added to the motion compensated prediction at adder 640. The output of the adder 640 is generally the same as what a decoder would produce for the block, and this block is stored back into the first frame store 550. The output of the adder 640 may also be delayed at a frame delay 642 prior to being stored at frame store 550.

It should be appreciated that FIG. 6 shows an implementation where the reference frame stored in first frame store 550 is a reconstructed reference frame and that the invention may also be implemented using original video frames as received in video signal 501.

An interpolator 590 is provided for interpolating, during the second and third tasks, pixel data in the first video frame (from the first frame store 550) for each block and sub-block of pixels to sub-pel resolution. This interpolation may occur on a block by block or sub-block by sub-block basis as needed (as shown in FIG. 6), or the first video frame may be interpolated once and the result stored in memory for use as needed in the second and third tasks.

The first motion compensator 510 computes, in the first task, a matching cost between each candidate block and the current block of pixels. The decision module 540 then compares each matching cost from each candidate block in turn with a lowest matching cost previously found, such that the best matched full pel block of pixels is a candidate block of pixels providing the lowest matching cost.

In the second task, the second motion estimator 520 computes, in the first sub-pel sub-block search, a matching cost between each candidate sub-pel sub-block and a respective one of the N current sub-blocks of pixels. The decision module 540 compares each matching cost from each candidate sub-pel sub-block in turn with a lowest matching cost previously found for each current sub-block, such that the N best matched sub-pel sub-blocks of pixels are the N candidate sub-pel sub-blocks of pixels providing the lowest matching cost for each of the N current sub-blocks, respectively. In the second sub-pel search, the second motion estimator 520 computes a matching cost between each sub-pel candidate block and the current block of pixels. The decision module 540 compares each matching cost from each candidate sub-pel block in turn with a lowest matching cost previously found, such that the best matched sub-pel block of pixels is a candidate sub-pel block of pixels providing the lowest matching cost.

In the third task, the third motion estimator 530 computes a matching cost between each candidate sub-pel sub-block and a respective one of the N current sub-blocks of pixels. The decision module 540 compares each matching cost from each candidate sub-pel sub-block in turn with a lowest matching cost previously found for each current sub-block, such that the N new best matched sub-pel sub-blocks of pixels are the N candidate sub-blocks of pixels providing the lowest matching cost for each of the N current sub-blocks, respectively.

Figure 7A:
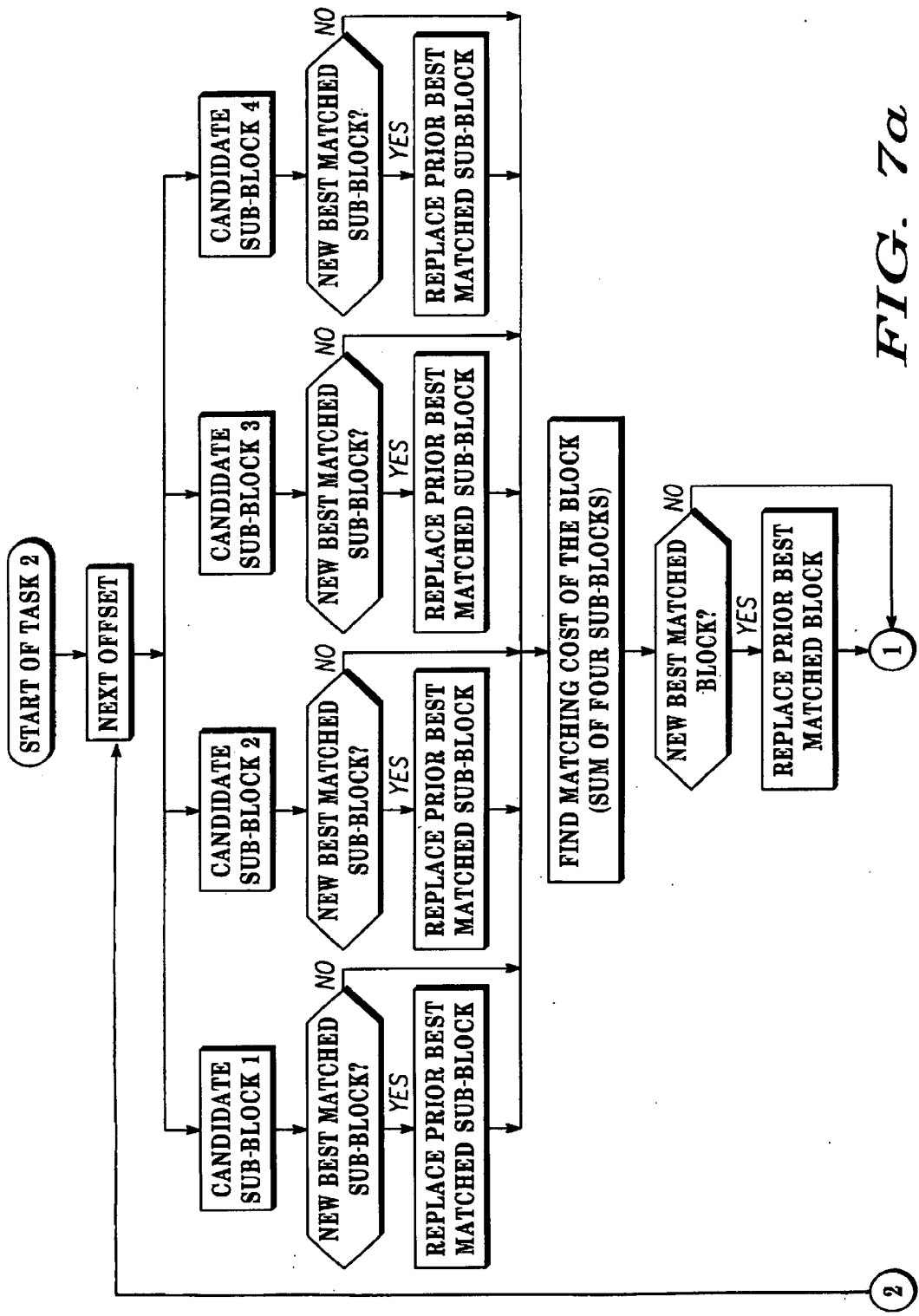
FIGS. 7a and 7b show a flowchart of the second task of the invention (FIG. 7a) and the third task of the invention (FIG. 7b).
Figure 7B:
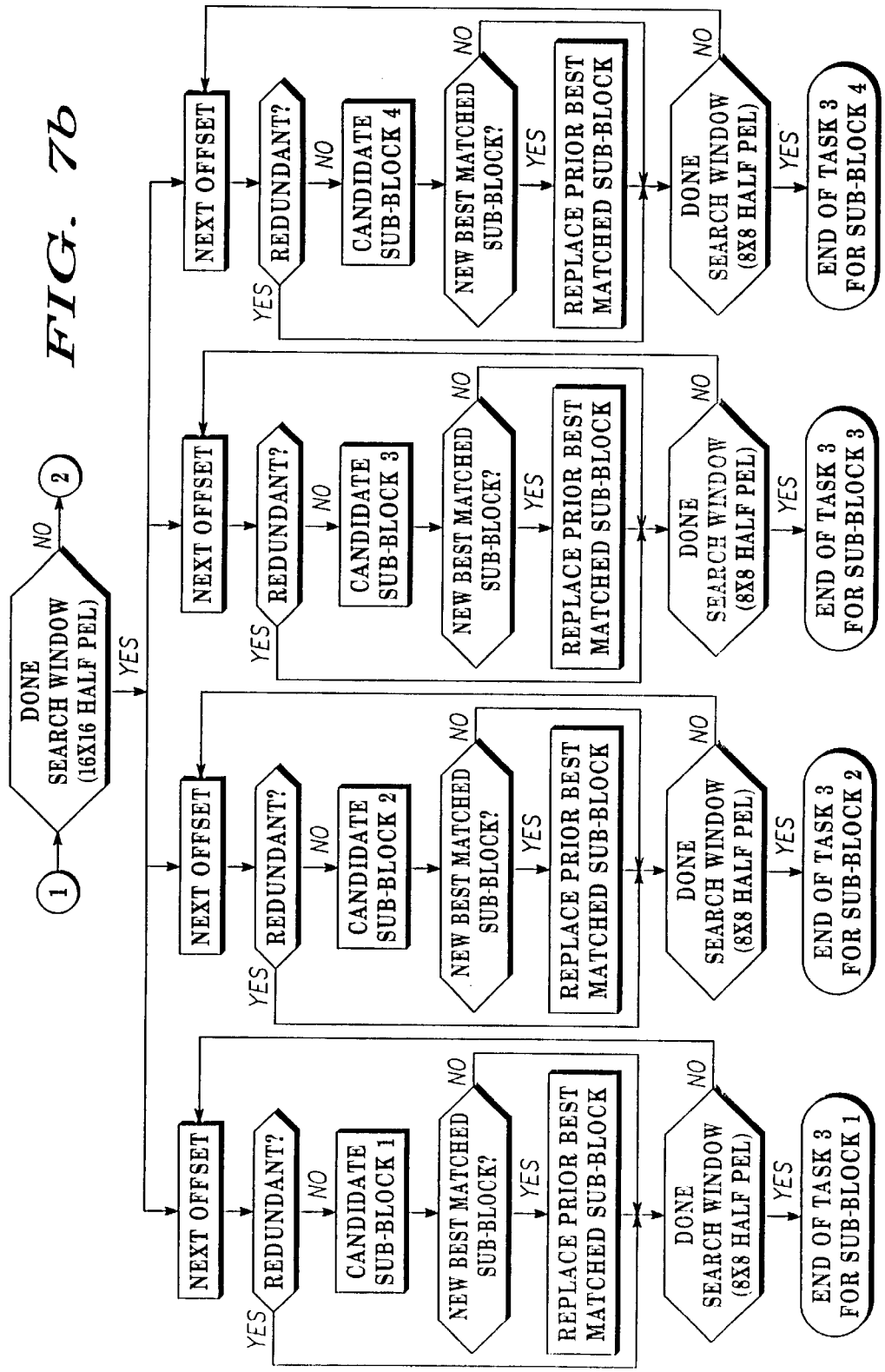

A specific implementation of the invention is outlined in the flowchart in FIG. 7 (FIGS. 7*a* and 7*b*). The implementation shown in FIG. 7 reduces encoder complexity by eliminating redundant search points in the third task. Although the savings in the third task is roughly 80% when information from the first and second tasks are used, this assumes that an FS-BMA is used for the 16×16 full pel search in the first task. Since the invention can be implemented to perform either a full pel search or a fast search (MVFAST) for the first task, in the implementation shown in FIG. 7, the first task is not incorporated into the third task. Instead, the embodiment shown eliminates only the redundancies between the second and third tasks (resulting in an approximate 60% savings in the third task).

Although there are several ways to implement a fast algorithm using the inventive concept, the embodiment illustrated in FIG. 7 breaks down 16×16 half pel block matching costs in the second task into four 8×8 half pel sub-block matching costs, and stores only the locations and matching costs of the four best 8×8 half pel sub-blocks while performing the 16×16 half pel search in the second task. "Matching costs" refers to the comparison between the candidate block or sub-block and the corresponding block or sub-block to be encoded using motion compensation. The matching cost may be a sum of the absolute difference between the candidate block or sub-block and the block or sub-block to be encoded, such as a measurement of the distortion between the blocks or sub-blocks.

FIG. 7*a* illustrates the second task while FIG. 7*b* illustrates the third task. In a first task a full pel search in a first predefined search area of a first video frame is conducted to locate a best matched full pel 16×16 block of pixels from a number of candidate blocks of pixels in the first predefined search area which is a closest match to a current block of pixels in a second video frame. The first task is not shown in the flowchart as such a search is well known in the art.

For purposes of the second task illustrated in FIG. 7*a*, the current 16×16 block of pixels is divided into four current 8×8 sub-blocks of pixels. A first half-pel search in a second predefined search area of the first video frame is conducted to locate four separate best matched half-pel 8×8 sub-blocks of pixels from a number of candidate half-pel 8×8 sub-blocks of pixels in the second predefined search area which are a closest match for each of the four current 8×8 sub-blocks of pixels, respectively. In addition, a second half-pel search in the second predefined search area is performed simultaneously to locate a best matched half-pel 16×16 block of pixels from a number of candidate half-pel 16×16 blocks of pixels in the second predefined search area which is a closest match to the current 16×16 block of pixels in the second video frame.

As shown in FIG. 7*a*, each candidate half pel 16×16 block in the second predefined search area is divided into four candidate half-pel 8×8 sub-blocks, candidate sub-block 1, candidate sub-block 2, candidate sub-block 3, and candidate sub-block 4. Each of the candidate sub-blocks are compared with the corresponding current 8×8 sub-blocks to determine the matching cost for that particular candidate sub-block. The candidate sub-block is then compared to a candidate sub-block at a next offset to determine the best matched 8×8 half-pel sub-block.

For example, in FIG. 7*a*, at a first offset in the predefined search area, candidate sub-block 1, candidate sub-block 2, candidate sub-block 3, and candidate sub-block 4 will correspond to the four 8×8 half-pel sub-blocks obtained from the first 16×16 candidate block. Matching costs between each of these four 8×8 half-pel sub-blocks and the four current 8×8 full pel sub-blocks obtained from the current 16×16 block are computed. As this is the beginning of the second task, no current best matched 8×8 sub-block exists for comparison, so candidate sub-block 1, candidate sub-block 2, candidate sub-block 3, and candidate sub-block 4 by default become the best matched 8×8 half-pel sub-block. The offset is then incremented so that a next block in the search window can be compared to the current best matched block. In the example shown, the offset will increase by 0.5 pel, as the second task involves half pel searches in the second predefined search area. In other words, the location of the next candidate 16×16 block in the second predefined search area moves (in any available direction in the search window) by one half pel at this second offset.

The candidate sub-block 1, candidate sub-block 2, candidate sub-block 3, and candidate sub-block 4 locations are now replaced by the four 8×8 half-pel sub-blocks which make up the 16×16 half-pel block at this next (second) offset. The matching costs for the four 8×8 half-pel sub-blocks at the second offset are then compared to the corresponding best matched sub-block from the previous offset. If the sub-blocks at the second offset are a better match for the respective current sub-block, that sub-block will then be stored as the best matched sub-block, replacing the previous best matched sub-block. If a sub-block at the second offset is not a better match for the respective current sub-block, the best matched sub-block will not be changed. This process is repeated for each offset available in the second predefined search area, resulting in four best matched 8×8 half-pel sub-blocks.

In addition, after each offset increase, the matching costs of the sub-blocks are summed to provide a matching cost for the candidate 16×16 half-pel block. This matching cost is compared with the previous best matched 16×16 half-pel block in the same manner as described above in connection with the 8×8 half-pel sub-blocks. If the sum of the matching costs results in a better match than previously located, the previous best matched 16×16 half-pel block up to that point is replaced by a 16×16 half-pel block which corresponds to the four 8×8 best matched sub-blocks up to that point. This process is repeated for each offset in the second predefined search area, resulting in a new best matched 16×16 half-pel block in the second predefined search area. The best matched 16×16 block at the beginning of the second task will be the 16×16 best matched full pel block obtained from the first task.

As shown in FIG. 7b, once the second predefined search area is exhausted (i.e. all offsets have been searched), the third task begins. In the third task, four separate half-pel searches are conducted in a third predefined search area to locate a new best matched half-pel 8×8 sub-block of pixels from a number of candidate half-pel 8×8 sub-blocks of pixels in the third predefined search area for each of the four current 8×8 sub-blocks of pixels. The process of comparison in the third task is similar to that described above in connection with the second task for locating the best matched 8×8 half-pel sub-blocks in FIG. 7a. However, in third task redundant search points are discarded such that the matching costs are not calculated or stored for the redundant search points. At the commencement of the third task, the new best matched sub-block for each search corresponds to the respective best matched 8×8 half-pel sub-block located during the second task (FIG. 7a). In other words, the initial best matched sub-block used in a first sub-pel search of the third task (FIG. 7b) is the best matched 8×8 half-pel sub-block from a first search of the second task (FIG. 7a).

For each of the four separate half-pel 8×8 sub-block searches in the third task, respective candidate half-pel 8×8 sub-blocks in the third predefined search window are compared to the four current 8×8 sub-blocks obtained from the current 16×16 block to obtain respective matching costs. The matching costs for each respective candidate sub-block for the four searches (i.e. candidate sub-block 1, candidate sub-block 2, candidate sub-block 3, and candidate sub-block 4) are compared to the new best matched sub-block located up until that point. However, at each offset, the current search point in the third predefined search area will first be reviewed to determine whether it corresponds to a search point located during the second task. If so, the 8×8 half-pel sub-block located at that search point will be determined to be redundant and will not be considered. Therefore, the matching cost for this redundant search point will not be calculated and the offset will be increased to the next location.

The third predefined search area is divided into four separate search windows for each of the four respective 8×8 half-pel sub-block searches.

The search position is considered redundant in the example shown in FIG. 7b if its distance from the second task search center is less than or equal to n*0.5 in the horizontal direction and less than or equal to m*0.5 in the vertical direction. Since the example embodiment shown in FIG. 7 implements half-pel searches, the search range in the second and third tasks are both assumed to be +/−n*0.5 pel in the horizontal direction and +/−m*0.5 pel in the vertical direction (where n and m are any positive integers).

If the search point is not redundant, the matching costs for the 8×8 half-pel sub-block at that offset will be computed and compared to the matching cost of the new best matched 8×8 half-pel sub-block located up until that point. If the matching cost is lower, the 8×8 half-pel sub-block at that offset will replace the new best matched sub-block, if not, the offset is increased.

This process is repeated for each offset available in the third predefined search area, resulting in four new best matched 8×8 half-pel sub-blocks. The current 16×16 full pel block to be encoded can then be encoded based on motion vectors derived from the four new best matched 8×8 half-pel sub-blocks from the third task, or motion vectors derived from the best matched 16×16 half-pel block from the second task This approach requires low complexity and memory storage but it is not identical to the traditional full search. (Other implementations of the invention, such as one that stores all nine matching costs, can be used to provide the same result as traditional full search.) It is possible in this implementation that the best matched block found in the second task is outside the search window for the third task. FIG. 2 illustrates such possibilities. If any of the "+" (only) positions in the second task happen to be the best matched block after the third task, then the MV calculated from this implementation will be different from the traditional full search. However, from a distortion point of view, this discrepancy always leads to an improvement over traditional full search, since the distortion of the best matched block using the proposed implementation is guaranteed to be lower than that of the traditional full search.

The proposed implementation can also be extended to incorporate both first and second tasks into the third task.

Additional possibilities exist when incorporating the first task into the third task. For example, the 16×16 full pel block search in the first task can also be broken down into four 8×8 full pel sub-block searches. The best 8×8 full pel sub-block found in the first task can then be compared against the 8×8 half pel sub-blocks in the third task, yielding a tradeoff between search range and precision. As before, with such an implementation, it is possible to get an improved result as compared with the traditional full search.

The above-described implementation provides an efficient method for half pel ME of an 8×8 sub-block which is standard-compliant for MPEG-4 and other video compression standards. The method shown in FIG. 7 can reduce the total number of searches for 8×8 ME by over 60% on average without degrading the search quality. In some cases, it can also slightly improve quality. The proposed method is easily extendible to higher sub-pixel resolutions, such as one half pel, one quarter pel, one eighth pel, and beyond.

Although the invention has been described in connection with conducting fill pel and half pel searches on specific sized blocks and sub-blocks of pixels, those skilled in the art will appreciate that the invention is not limited to the specific embodiment shown in FIG. 7. The present invention is extendable to quarter pel and eighth pel searches on pixel blocks and sub-blocks of varying sizes.

It should now be appreciated that the present invention provides advantageous methods and apparatus for sub-pixel motion estimation for encoding of digital video signals.

Although the invention has been described in connection with various illustrated embodiments, numerous modifications and adaptations may be made thereto without departing from the spirit and scope of the invention as set forth in the claims.

What is claimed is:

1. A method for motion estimation between blocks of pixels from a first video frame and a second video frame, comprising the steps of:
   adaptively processing a current block of pixels from a second video frame in a first task;
   adaptively processing said current block of pixels and current sub-blocks of pixels of said current block of pixels in a second task;
   adaptively processing said current sub-blocks of pixels in a third task;
   locating search points in a first video frame for: (1) a block of pixels from said first task; (2) a block and a plurality of sub-blocks of pixels from said second task; and (3) a plurality of sub-blocks of pixels from said third task, which provide the lowest matching costs for one of said current block of pixels and said current sub-blocks of pixels; and
   discarding search points which are redundant between at least one of: (1) the first and third tasks during the third task; (2) the first and second tasks during the second task; and (3) the second and third tasks during the third task.

2. A method in accordance with claim 1, further comprising the steps of:
   in the first task, conducting a full pel search in a first predefined search area of a first video frame to locate a best matched full pel block of pixels from a number of candidate blocks of pixels in the first predefined search area which is a closest match to a current block of pixels in a second video frame;
   dividing the current block of pixels into N current sub-blocks of pixels;
   in the second task, conducting: (1) a first sub-pel search in a second predefined search area of the first video frame to locate N separate best matched sub-pel sub-blocks of pixels from a number of candidate sub-pel sub-blocks of pixels in the second predefined search area which are a closest match for each of the N current sub-blocks of pixels, respectively; and (2) a second sub-pel search in the second predefined search area to locate a best matched sub-pel block of pixels from a number of candidate sub-pel blocks of pixels in the second predefined search area which is a closest match to the current block of pixels in the second video frame; and
   in the third task, conducting N separate sub-pel searches in a third predefined search area to locate a new best matched sub-pel sub-block of pixels from a number of candidate sub-pel sub-blocks of pixels in the third predefined search area for each of the N current sub-blocks of pixels.

3. A method in accordance with claim 2, further comprising the step of:
   storing at least one of: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task.

4. A method in accordance with claim 3, wherein the matching costs for the candidate blocks and sub-blocks located at the redundant search points are not calculated and not stored.

5. A method in accordance with claim 3, further comprising the step of:
   calculating one or more motion vectors for encoding the current block of pixels in the second video frame based on one of: (1) the N new best matched sub-pel sub-blocks of pixels from the third task; or (2) the best matched sub-pel block of pixels from the second task.

6. A method in accordance with claim 3, wherein:
   the first predefined search area is centered in the first video frame at a location corresponding to that of the current block of pixels in the second video frame;
   the second predefined search area is centered at the best matched block of pixels located during the first task; and
   the third predefined search area is centered at the best matched sub-pel block of pixels located during the second task, said third predefined search area having N search windows corresponding respectively to each of the N separate sub-pel sub-block searches.

7. A method in accordance with claim 6, wherein:
   the first predefined search area in the first video frame comprises a general region around the corresponding position of the current block of pixels in the second video frame.

8. A method in accordance with claim 6, wherein:
   the second predefined search area is extended in all directions by at least one sub-pel beyond the best matched block of pixels obtained from the first task.

9. A method in accordance with claim 6, wherein:
   each of the N search windows are extended in all directions by at least one sub-pel beyond a respective sub-pel sub-block of pixels obtained from the best matched sub-pel block located during the second task.

10. A method in accordance with claim 3, wherein:
the search points and matching costs for the plurality of candidate sub-pel sub-blocks from the third task comprise at least the search points and matching costs for the N new best matched sub-pel sub-blocks; and
one or more motion vectors for encoding the current block of pixels in the second video frame are calculated based on one of: (1) the N new best matched sub-pel sub-blocks of pixels from the third task; or (2) the best matched sub-pel block of pixels from the second task.

11. A method in accordance with claim 3, wherein:
each of (1) the search points and matching costs for at least one candidate block of pixels from the first task; (2) the search points and matching costs for a plurality of candidate sub-pel sub-blocks from the second task; (3) search points and matching costs for at least one candidate sub-pel block of pixels from the second task; and (4) the search points and matching costs for a plurality of candidate sub-pel sub-blocks from the third task are stored; and
search points which are redundant between each of: (1) the first and third tasks; (2) the first and second tasks; and (3) the second and third tasks are discarded, such that the matching costs for the candidate blocks and sub-blocks located at such redundant search points are not calculated.

12. A method in accordance with claim 3, wherein:
the search points and matching costs for at least one candidate block of pixels from the first task are stored; and
search points which are redundant between the first and second tasks are discarded, such that the matching costs for the candidate blocks located at such redundant search points are not calculated.

13. A method in accordance with claim 3, further comprising:
in the first task:
conducting a full pel search in the first predefined search area of the first video frame to locate N separate best matched full pel sub-blocks of pixels from a number of candidate full pel sub-blocks of pixels in the first predefined search area which are a closest match for each of the N current sub-blocks of pixels, respectively; and
storing the search points and matching costs for a plurality of candidate full pel sub-blocks of pixels from the first task; and
discarding search points which are redundant between at least one of: (1) the first and second tasks; and (2) the first and third tasks, such that the matching costs for the candidate blocks and sub-blocks located at such redundant search points are not calculated.

14. A method in accordance with claim 3, wherein:
the search points and matching costs for a plurality of candidate sub-pel sub-blocks from the second task are stored;
search points which are redundant between the second and third tasks are discarded, such that the matching costs for the candidate blocks and sub-blocks located at such redundant search points are not calculated.

15. A method in accordance with claim 3, wherein:
each predefined search area comprises one of a square block of pixels, a rectangular block of pixels, a diamond-shaped block of pixels, or an irregular shaped block of pixels.

16. A method in accordance with claim 3, further comprising the step of:
for the second and third tasks, interpolating pixel data in the first video frame for each block and sub-block of pixels to sub-pel resolution.

17. A method in accordance with claim 3, wherein:
a search range of the second task is +/−n*p pel in the horizontal direction and +/−m*p pel in the vertical direction, where n and m are any positive integers and p is any fraction;
the search points of the third task are considered redundant over the search points of the second task where a distance of a search point of the third task from a center of the second predefined search area is: (1) less than or equal to n*p pel in a horizontal direction; and (2) less than or equal to m*p pel in a vertical direction; and
matching costs for candidate blocks located at the redundant search points are not calculated.

18. A method in accordance with claim 17, wherein:
said sub-pel searches comprise one of: (1) ½ pel searches where p equals 0.5; (2) ¼ pel searches where p equals 0.25; or (3) ⅛ pel searches where p equals 0.125.

19. A method in accordance with claim 3, wherein:
the first task comprises the steps of:
computing a matching cost between each candidate block and the current block of pixels; and
comparing each matching cost from each candidate block in turn with a lowest matching cost previously found;
wherein the best matched full pel block of pixels is a candidate block of pixels providing the lowest matching cost.

20. A method in accordance with claim 19, wherein the matching cost comprises a distortion measurement between the candidate block and the current block.

21. A method in accordance with claim 3, wherein:
the second task comprises the steps of:
in the first sub-pel search:
computing a matching cost between each candidate sub-pel sub-block and a respective one of the N current sub-blocks of pixels; and
comparing each matching cost from each candidate sub-pel sub-block in turn with a lowest matching cost previously found for each current sub-block;
wherein the N best matched sub-pel sub-blocks of pixels are the N candidate sub-pel sub-blocks of pixels providing the lowest matching cost for each of the N current sub-blocks, respectively; and
in the second sub-pel search:
computing a matching cost between each sub-pel candidate block and the current block of pixels; and
comparing each matching cost from each candidate sub-pel block in turn with a lowest matching cost previously found;
wherein the best matched sub-pel block of pixels is a candidate sub-pel block of pixels providing the lowest matching cost.

22. A method in accordance with claim 21, wherein:
in the second task, said first sub-pel search and said second sub-pel search are performed simultaneously; and
the matching costs for each candidate sub-pel block of pixels comprises the sum of the matching costs of N of the sub-pel sub-blocks of pixels.

23. A method in accordance with claim 21, wherein the matching cost comprises a distortion measurement between one of the candidate sub-pel block and the current block or the candidate sub-pel sub-block and the current sub-block.

24. A method in accordance with claim 3, wherein:
the third task comprises the steps of:
computing a matching cost between each candidate sub-pel sub-blocks and a respective one of the N current sub-blocks of pixels; and
comparing each matching cost from each candidate sub-pel sub-block in turn with a lowest matching cost previously found for each current sub-block;
wherein the N new best matched sub-pel sub-blocks of pixels are the N candidate sub-blocks of pixels providing the lowest matching cost for each of the N current sub-blocks, respectively.

25. A method in accordance with claim 24, wherein the matching cost comprises a distortion measurement between the candidate sub-pel sub-block and the current sub-block.

26. A method in accordance with claim 3, wherein N is any positive integer greater than one.

27. A method in accordance with claim 1, wherein said sub-pel searches comprise one of a ½ pel search, a ¼ pel search, or a ⅛ pel search.

28. A method in accordance with claim 1, wherein:
said blocks comprise 16×16 blocks of pixels; and
said sub-blocks comprise one of 8×8 blocks of pixels, 6×6 blocks of pixels, 4×4 blocks of pixels, or 2×2 blocks of pixels.

29. A method in accordance with claim 1, wherein:
said blocks comprise 8×8 blocks of pixels; and
said sub-blocks comprise one of 6×6 blocks of pixels, 4×4 blocks of pixels, or 2×2 blocks of pixels.

30. A method in accordance with claim 1, wherein said sub-blocks of pixels each contain an identical number of pixels.

31. A method in accordance with claim 1, wherein each sub-block of pixels comprises an identically shaped block of pixels each containing an identical number of pixels.

32. Apparatus for motion estimation between blocks of pixels from a first video frame and a second video frame, comprising:
a first motion estimator for adaptively processing a current block of pixels from a second video frame in a first task;
a second motion estimator for adaptively processing said current block of pixels and current sub-blocks of pixels of said current block of pixels in a second task;
a third motion estimator for adaptively processing said current sub-blocks of pixels in a third task; and
a decision module for determining search points in a first video frame for: (1) a block of pixels from said first task; (2) a block and a plurality of sub-blocks of pixels from said second task; and (3) a plurality of sub-blocks of pixels from said third task, which provide the lowest matching costs for one of said current block of pixels and said current sub-blocks of pixels; and
wherein search points which are redundant between at least one of: (1) the first and third tasks during the third task; (2) the first and second tasks during the second task; and (3) the second and third tasks during the third task, are discarded.

33. An apparatus in accordance with claim 32, further comprising:
a first frame store for storing said first video frame;
a second frame store for storing said second video frame; and a motion compensator for predicting the current block of pixels using at least one of said blocks or said sub-blocks with the lowest matching costs from the decision module;
wherein:
the first motion estimator compares, in the first task during a full pel search, a current block of pixels from said second video frame with a number of candidate full pel blocks of pixels from a first predefined search area of said first video frame to locate a best matched full pel block of pixels in the first predefined search area which is a closest match to the current block of pixels in said second video frame;
the second motion estimator (1) compares, in the second task during a first sub-pel search, N current sub-blocks of pixels obtained from dividing the current block of pixels with a number of candidate sub-pel sub-blocks of pixels from a second predefined search area of said first video frame to locate N separate best matched sub-pel sub-blocks of pixels in the second predefined search area which are a closest match for each of the N current sub-blocks of pixels, respectively; and (2) compares, in the second task during a second sub-pel search, the current block of pixels with a number of candidate sub-pel blocks of pixels in the second predefined search to locate a best matched sub-pel block of pixels in the second predefined search area which is a closest match to the current block of pixels;
the third motion estimator compares, in a third task sub-pel search, the N current sub-blocks of pixels with a number of candidate sub-pel sub-blocks of pixels from a third predefined search area of said first video frame to locate a new best matched sub-pel sub-block of pixels in the third predefined search area for each of the N current sub-blocks of pixels; and
the decision module determines which blocks and sub-blocks from at least one of the first, second and third motion estimators have the lowest matching costs.

34. Apparatus in accordance with claim 33, further comprising:
memory for storing at least one of: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task.

35. Apparatus in accordance with claim 34, wherein the matching costs for the candidate blocks and sub-blocks located at the redundant search points are not calculated and not stored.

36. Apparatus in accordance with claim 34, wherein:
said motion compensator predicts the current block of pixels in the second video frame based on one of: (1) the N new best matched sub-pel sub-blocks of pixels from the third task; or (2) the best matched sub-pel block of pixels from the second task.

37. Apparatus in accordance with claim 34, wherein:
the first predefined search area is centered in the first video frame at a location corresponding to that of the current block of pixels in the second video frame;

the second predefined search area is centered at the best matched block of pixels located during the first task; and the third predefined search area is centered at the best matched sub-pel block of pixels located during the second task, said third predefined search area having N search windows corresponding respectively to each of the N separate sub-pel sub-block searches.

38. Apparatus in accordance with claim 37, wherein:

the first predefined search area in the first video frame comprises a general region around the corresponding position of the current block of pixels in the second video frame.

39. Apparatus in accordance with claim 37, wherein:

the second predefined search area is extended in all directions by at least one sub-pel beyond the best matched block of pixels obtained from the first task.

40. Apparatus in accordance with claim 37, wherein:

each of the N search windows are extended in all directions by at least one sub-pel beyond a respective sub-pel sub-block of pixels obtained from the best matched sub-pel block located during the second task.

41. Apparatus in accordance with claim 34, wherein:

the search points and matching costs for the plurality of candidate sub-pel sub-blocks from the third task comprise at least the search points and matching costs for the N new best matched sub-pel sub-blocks; and the motion compensator predicts the current block of pixels in the second video frame based on one of: (1) the N new best matched sub-pel sub-blocks of pixels from the third task; or (2) the best matched sub-pel block of pixels from the second task.

42. Apparatus in accordance with claim 34, wherein:

each of (1) the search points and matching costs for at least one candidate block of pixels from the first task; (2) the search points and matching costs for a plurality of candidate sub-pel sub-blocks from the second task; (3) search points and matching costs for at least one candidate sub-pel block of pixels from the second task; and (4) the search points and matching costs for a plurality of candidate sub-pel sub-blocks from the third task are stored; and search points which are redundant between each of: (1) the first and third tasks; (2) the first and second tasks; and (3) the second and third tasks are discarded, such that the matching costs for the candidate blocks and sub-blocks located at such redundant search points are not calculated.

43. Apparatus in accordance with claim 34, wherein:

the search points and matching costs for at least one candidate block of pixels from the first task are stored; and search points which are redundant between the first and second tasks are discarded, such that the matching costs for the candidate blocks located at such redundant search points are not calculated.

44. Apparatus in accordance with claim 34, further comprising:

in the first task:
said first motion estimator compares, in a first task full pel search, the N current sub-blocks of pixels with a number of candidate full pel sub-blocks of pixels from the first predefined search area to locate N separate best matched full pel sub-blocks of pixels in the first predefined search area which are a closest match for each of the N current sub-blocks of pixels, respectively;

wherein:
the search points and matching costs for a plurality of candidate full pel sub-blocks of pixels from the first task are stored; and search points which are redundant between at least one of: (1) the first and second tasks; and (2) the first and third tasks, are discarded, such that the matching costs for the candidate blocks and sub-blocks located at such redundant search points are not calculated.

45. Apparatus in accordance with claim 34, wherein:

the search points and matching costs for a plurality of candidate sub-pel sub-blocks from the second task are stored;

search points which are redundant between the second and third tasks are discarded, such that the matching costs for the candidate blocks and sub-blocks located at such redundant search points are not calculated.

46. Apparatus in accordance with claim 34, wherein:

each predefined search area comprises one of a square block of pixels, a rectangular block of pixels, a diamond-shaped block of pixels, or an irregular shaped block of pixels.

47. Apparatus in accordance with claim 34, further comprising:

an interpolator for interpolating, during the second and third tasks, pixel data in the first video frame for each block and sub-block of pixels to sub-pel resolution.

48. Apparatus in accordance with claim 34, wherein:

a search range of the second task is $+/-n*p$ pel in the horizontal direction and $+/-m*p$ pel in the vertical direction, where n and m are any positive integers and p is any fraction;

the search points of the third task are considered redundant over the search points of the second task where a distance of a search point of the third task from a center of the second predefined search area is: (1) less than or equal to $n*p$ pel in a horizontal direction; and (2) less than or equal to $m*p$ pel in a vertical direction; and matching costs for candidate blocks located at the redundant search points are not calculated.

49. Apparatus in accordance with claim 48, wherein:

said sub-pel searches comprise one of: (1) ½ pel searches where p equals 0.5; (2) ¼ pel searches where p equals 0.25; or (3) ⅛ pel searches where p equals 0.125.

50. Apparatus in accordance with claim 34, wherein:

the first motion compensator computes a matching cost between each candidate block and the current block of pixels; and the decision module compares each matching cost from each candidate block in turn with a lowest matching cost previously found; and the best matched full pel block of pixels is a candidate block of pixels providing the lowest matching cost.

51. Apparatus in accordance with claim 50, wherein the matching cost comprises a distortion measurement between the candidate block and the current block.

52. Apparatus in accordance with claim 34, wherein:

in the first sub-pel search:
the second motion estimator computes a matching cost between each candidate sub-pel sub-block and a respective one of the N current sub-blocks of pixels;

the decision module compares each matching cost from each candidate sub-pel sub-block in turn with a lowest matching cost previously found for each current sub-block; and the N best matched sub-pel sub-blocks of pixels are the N candidate sub-pel sub-blocks of pixels providing the lowest matching cost for each of the N current sub-blocks, respectively; and in the second sub-pel search:
the second motion compensator computes a matching cost between each sub-pel candidate block and the current block of pixels; and
the decision module compares each matching cost from each candidate sub-pel block in turn with a lowest matching cost previously found; and
the best matched sub-pel block of pixels is a candidate sub-pel block of pixels providing the lowest matching cost.

53. Apparatus in accordance with claim 52, wherein:
in the second task, said first sub-pel search and said second sub-pel search are performed simultaneously; and
the matching costs for each candidate sub-pel block of pixels comprises the sum of the matching costs of N of the sub-pel sub-blocks of pixels.

54. Apparatus in accordance with claim 52, wherein the matching cost comprises a distortion measurement between one of the candidate sub-pel block and the current block or the candidate sub-pel sub-block and the current sub-block.

55. Apparatus in accordance with claim 34, wherein:
the third motion estimator computes a matching cost between each candidate sub-pel sub-block and a respective one of the N current sub-blocks of pixels;
the decision module compares each matching cost from each candidate sub-pel sub-block in turn with a lowest matching cost previously found for each current sub-block; and
the N new best matched sub-pel sub-blocks of pixels are the N candidate sub-blocks of pixels providing the lowest matching cost for each of the N current sub-blocks, respectively.

56. Apparatus in accordance with claim 55, wherein the matching cost comprises a distortion measurement between the candidate sub-pel sub-block and the current sub-block.

57. Apparatus in accordance with claim 34, wherein N is any positive integer greater than one.

58. Apparatus in accordance with claim 32, wherein said sub-pel searches comprise one of a ½ pel search, a ¼ pel search, or a ⅛ pel search.

59. Apparatus in accordance with claim 32, wherein:
said blocks comprise 16×16 blocks of pixels; and
said sub-blocks comprise one of 8×8 blocks of pixels, 6×6 blocks of pixels, 4×4 blocks of pixels, or 2×2 blocks of pixels.

60. Apparatus in accordance with claim 32, wherein:
said blocks comprise 8×8 blocks of pixels; and
said sub-blocks comprise one of 6×6 blocks of pixels, 4×4 blocks of pixels, or 2×2 blocks of pixels.

61. Apparatus in accordance with claim 32, wherein said sub-blocks of pixels each contain an identical number of pixels.

62. Apparatus in accordance with claim 32, wherein each sub-block of pixels comprises an identically shaped block of pixels each containing an identical number of pixels.

63. A method for motion estimation of a block of pixels, comprising the steps of:
in a first task, conducting a full pel search in a first predefined search area of a first video frame to locate a best matched full pel block of pixels from a number of candidate blocks of pixels in the first predefined search area which is a closest match to a current block of pixels in a second video frame;
dividing the current block of pixels into N current sub-blocks of pixels;
in a second task, conducting: (1) a first sub-pel search in a second predefined search area of the first video frame to locate N separate best matched sub-pel sub-blocks of pixels from a number of candidate sub-pel sub-blocks of pixels in the second predefined search area which are a closest match for each of the N current sub-blocks of pixels, respectively; and (2) a second sub-pel search in the second predefined search area to locate a best matched sub-pel block of pixels from a number of candidate sub-pel blocks of pixels in the second predefined search area which is a closest match to the current block of pixels in the second video frame;
in a third task, conducting N separate sub-pel searches in a third predefined search area to locate a new best matched sub-pel sub-block of pixels from a number of candidate sub-pel sub-blocks of pixels in the third predefined search area for each of the N current sub-blocks of pixels;
storing at least one of: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task; and
discarding search points which are redundant between at least one of: (1) the first and third tasks during the third task; (2) the first and second tasks during the second task; and (3) the second and third tasks during the third task, such that the matching costs for said redundant search points are not calculated and not stored.

64. An apparatus for motion estimation of a block of pixels, comprising:
a first frame store for storing a first video frame;
a second frame store for storing a second video frame;
a first motion estimator for comparing, in a first task full pel search, a current block of pixels from said second video frame with a number of candidate full pel blocks of pixels from a first predefined search area of said first video frame to locate a best matched full pel block of pixels in the first predefined search area which is a closest match to the current block of pixels in said second video frame;
a second motion estimator for (1) comparing, in a second task first sub-pel search, N current sub-blocks of pixels obtained from dividing the current block of pixels with a number of candidate sub-pel sub-blocks of pixels from a second predefined search area of said first video frame to locate N separate best matched sub-pel sub-blocks of pixels in the second predefined search area which are a closest match for each of the N current sub-blocks of pixels, respectively; and (2) comparing, in a second task second sub-pel search, the current block of pixels with a number of candidate sub-pel blocks of pixels in the second predefined search to locate a best matched sub-pel block of pixels in the second predefined search area which is a closest match to the current block of pixels;
a third motion estimator for comparing, in a third task sub-pel search, the N current sub-blocks of pixels with a number of candidate sub-pel sub-blocks of pixels from a third predefined search area of said first video frame to locate a new best matched sub-pel sub-block of pixels in the third predefined search area for each of the N current sub-blocks of pixels;

a decision module for determining which blocks and sub-blocks from at least one of the first, second and third motion estimators have the lowest matching costs;

a motion compensator for predicting the current block of pixels using at least one of said blocks or said sub-blocks with the lowest matching costs from the decision module; and memory for storing at least one of: (1) search points and matching costs for at least one candidate block of pixels from the first task; (2) search points and matching costs for a plurality of candidate sub-pel sub-blocks of pixels from the second task; (3) search points and matching costs for at least one candidate sub-pel block of pixels from the second task; and (4) search points and matching costs for a plurality of candidate sub-pel sub-blocks of pixels from the third task;

wherein redundant search points between at least one of: (1) the first and third tasks during the third task; (2) the first and second tasks during the second task; and (3) the second and third tasks during the third task, are discarded, such that the matching costs for the candidate blocks and sub-blocks located at such redundant search points are not calculated and not stored.

* * * * *